United States Patent
Nishikawa et al.

(10) Patent No.: US 6,327,084 B1
(45) Date of Patent: Dec. 4, 2001

(54) DISPLAY SYSTEM WHERE POLARIZED LIGHT IMPINGES ON PLATELIKE LAMINATE AT BREWSTER'S ANGLE OR EMERGES THEREFROM AT ANGLE EQUAL THERETO

(75) Inventors: Shinji Nishikawa; Kazuya Kobayashi; Motoh Asakura, all of Mie (JP)

(73) Assignee: Central Glass Company, Limited, Ube (JP)

( * ) Notice: Subject to any disclaimer, the term of this patent is extended or adjusted under 35 U.S.C. 154(b) by 0 days.

(21) Appl. No.: 09/107,404

(22) Filed: Jun. 30, 1998

(30) Foreign Application Priority Data

Jun. 30, 1997 (JP) .................................................. 9-174517

(51) Int. Cl.[7] ............................. G02B 5/30; G02B 27/28
(52) U.S. Cl. ......................... 359/487; 359/493; 359/495; 359/630; 359/631; 353/13; 349/11; 345/7
(58) Field of Search .................................. 359/487, 493, 359/494, 495, 499, 501, 630, 631, 13; 353/13, 14; 345/7; 349/11

(56) References Cited

U.S. PATENT DOCUMENTS

| | | | | |
|---|---|---|---|---|
| 2,237,565 | * | 4/1941 | Land | 359/493 |
| 3,026,763 | * | 3/1962 | Marks | 359/493 |
| 3,377,118 | * | 4/1968 | MacNeille | 359/499 |
| 3,647,278 | * | 3/1972 | Makas | 359/501 |
| 4,973,132 | * | 11/1990 | McDonald et al. . | |
| 5,050,966 | * | 9/1991 | Berman | 359/630 |
| 5,066,108 | * | 11/1991 | McDonald . | |
| 5,212,471 | * | 5/1993 | McDonald | 359/15 |
| 5,510,913 | | 4/1996 | Hashimoto et al. . | |
| 5,579,139 | * | 11/1996 | Abileah et al. . | |
| 5,999,314 | * | 12/1999 | Asakura et al. | 359/487 |

FOREIGN PATENT DOCUMENTS

| | | | | |
|---|---|---|---|---|
| 0421866 A1 | * | 4/1991 | (EP) | 359/487 |
| 2-141702A | | 5/1990 | (JP) . | |
| 2-294615A | | 12/1990 | (JP) . | |
| 8-292393A | | 11/1996 | (JP) . | |
| 0045218 | * | 3/1986 | (JP) | 359/487 |

* cited by examiner

Primary Examiner—Ricky D. Shafer
(74) Attorney, Agent, or Firm—Crowell & Moring LLP

(57) ABSTRACT

The invention relates to a display system where polarized light rays from a display device impinge on a laminate at Brewster's angle or emerge therefrom at an angle equal to Brewster's angle. This laminate is a combination of a transparent platelike object and a functional film that is an optical rotatory film or a semitransparent film. The platelike object has a front major surface, facing the display device, and a back major surface. The display device has a polarizing member for polarizing light rays of the display device into S-wave or P-wave light rays. According to a first embodiment of the invention, the optical rotatory film is formed on the front or back major surface of the platelike object or in an inside of the platelike object, and S-wave light rays from the polarizing member are thrown against the front major surface of the laminate. With this, a part of the S-wave light rays is reflected from the front major surface of the laminate toward a viewer. The rest of the S-wave light rays is transmitted in the platelike object and converted into P-wave light rays by the optical rotatory film. Then, substantially all of the P-wave light rays emerge from the back major surface of the laminate into the air at an angle substantially equal to Brewster's angle of the platelike object or the optical rotatory member, which borders on the back major surface of the laminate. Thus, the double image phenomenon does not arise.

9 Claims, 5 Drawing Sheets

DISPLAY SYSTEM WHERE POLARIZED LIGHT IMPINGES ON PLATELIKE LAMINATE AT BREWSTER'S ANGLE OR EMERGES THEREFROM AT ANGLE EQUAL THERETO

BACKGROUND OF THE INVENTION

The present invention relates to a display system where polarized light from a display impinges on a platelike laminate at Brewster's angle or emerges therefrom at an angle equal to Brewster's angle. This display system can be used as a head-up display system which allows, for example, the driver of a car to view vehicular information, while looking out a front windshield of the car, by projecting the vehicular information in the direction of the front windshield. Furthermore, the display system of the present invention can be used for projecting various images, for example, on a shopwindow.

Hitherto, various head-up display systems have been proposed. For example, there is provided a head-up display system where a reflection film, having a so-called half mirror property, is installed on the surface of a single glass plate or in the inside of a laminated glass. In this head-up display system, light is inevitably reflected from the inboard or outboard surface of the glass plate, as well as from the reflection film. This causes a problem of double image (ghost) phenomenon. To eliminate this problem, for example, Japanese Patent First Publication JP-A-2-141720 discloses a head-up display system having a phase film such as a $\lambda/2$ film. This film serves to rotate the plane of polarization of polarized light having a particular wavelength of $\lambda$. JP-A-2-294615 discloses another head-up display system having a transparent birefringent film, for example, of polyethylene terephthalate. U.S. Pat. No. 5,510,913, corresponding to JP-A-6-40271, discloses another display system having an optical rotatory film comprising a special liquid crystal polymer. JP-A-8-292393, corresponding to Japanese Patent Application 7-98878, discloses an automotive head-up display system where a polarized S-wave impinges on a laminated glass. This laminated glass has inboard and outboard glass plates and an interlayer film disposed therebetween. Furthermore, an optical rotatory film is disposed between the interlayer film and the inboard or outboard glass plate, and a semitransparent film is disposed on the inboard surface of the optical rotatory film. Still furthermore, a reflection preventive film is formed on the inboard glass plate. According to all of the above-mentioned publications, light from the display device impinges on the glass plate at an angle that is substantially equal to Brewster's angle.

SUMMARY OF THE INVENTION

The inventors assume that, according to all of the above-mentioned conventional publications, the light ray of the center line (optical axis) of the display device is designed to be incident on a transparent platelike object (glass plate) at Brewster's angle, but the other light rays except that of the center line are not. Therefore, we assume that the double image problem is not completely eliminated throughout the entire light rays from the display device in the above-mentioned conventional publications.

It is therefore an object of the present invention to provide a display system where the double image problem is substantially completely eliminated throughout the entire light rays of a display device.

According to the present invention, there is provided a display system where polarized light rays from a display device impinge on a platelike laminate at Brewster's angle or emerge therefrom at an angle equal to Brewster's angle, as will be clarified hereinafter. This platelike laminate is a combination of a transparent platelike object and a functional film that is an optical rotatory film or a semitransparent reflective film. The platelike object has front and back major surfaces opposed to each other. The display device has a polarizing member for polarizing the light rays of the display device into S-wave or P-wave light rays. The optical rotatory film of the platelike laminate rotates a plane of polarization of light rays. In other words, the optical rotatory film converts S-wave light rays into P-wave light rays, or alternatively converts P-wave light rays into S-wave light rays. The semitransparent reflective film of the platelike laminate reflects a part of light rays incident thereon and transmits the rest of the light rays therethrough.

A display system according to a first aspect of the present invention is characterized as follows. The display device throws light rays that are intended to be viewed by a viewer, against a front major surface of the platelike laminate, and its polarizing member polarizes the light rays into S-wave light rays. Furthermore, the optical rotatory film is formed on the front or back major surface of the platelike object or in an inside of the platelike object. The platelike laminate has a back major surface that is an interface between the platelike laminate and an air. The front major surface of the platelike laminate faces the display device such that a part of the S-wave light rays from the polarizing member is reflected from the front major surface of the platelike laminate towards the viewer and that the remainder of the S-wave light rays is transmitted in the platelike laminate and is converted by the optical rotatory film into P-wave light rays. The back major surface of the platelike laminate is curved such that substantially all of the P-wave light rays emerge from the back major surface of the platelike laminate into the air at an angle that is substantially equal to Brewster's angle of one member of said optical rotatory film and said platelike object, which one member borders on the back major surface of the platelike laminate. In other words, when the optical rotatory film is formed on the back major surface of the platelike object, the above angle is substantially equal to Brewster's angle of the optical rotatory film. In contrast, when the optical rotatory film is formed on the front major surface of the platelike object, the above angle is substantially equal to Brewster's angle of the platelike object. The above angle is defined between a direction of propagation of the P-wave light ray in the air and a line that is perpendicular to the back major surface of the platelike laminate at a point of emergence of the P-wave light ray from the platelike laminate into the air.

A display system according to a second aspect of the present invention is characterized as follows. The optical rotatory film is formed on the front or back major surface of the platelike object or in an inside of the platelike object. The display device throws light rays that are intended to be viewed by a viewer, against the front major surface of the platelike laminate, and its polarizing member polarizes the light rays into P-wave light rays. The front major surface of the platelike laminate is curved such that substantially all of the P-wave light rays from the polarizing member are incident on the front major surface of the platelike laminate at Brewster's angle.

A display system according to a third aspect of the present invention is characterized as follows. The display device throws light rays that are intended to be viewed by a viewer, against the front major surface of the platelike object, and its polarizing member polarizes the light rays into P-wave light rays. The semitransparent film is formed on the back major surface of the platelike object. The front major surface of the platelike object is curved such that substantially all of the P-wave light rays from the polarizing member are incident on the front major surface at Brewster's angle of the platelike object.

A display system according to a fourth aspect of the present invention is characterized as follows. The semitransparent reflective film is formed on the front major surface of the platelike object. The display device throws light rays that are intended to be viewed by a viewer, against the reflective film, and its polarizing member polarizes the light rays into P-wave light rays. The reflective film faces the display device such that a part of the P-wave light rays from the polarizing member is reflected from the reflective film towards the viewer and that the remainder of the P-wave light rays is transmitted in the reflective film and then in the platelike object. The back major surface of the platelike object is curved such that substantially all of the remainder of the P-wave light rays emerge from the back major surface thereof into the air at an angle that is substantially equal to Brewster's angle of the platelike object. This angle is defined in the same manner as in the first aspect of the invention.

Thus, according to the present invention, the double image problem does not at all arise.

DESCRIPTION OF THE PREFERRED EMBODIMENTS

Figure 1:
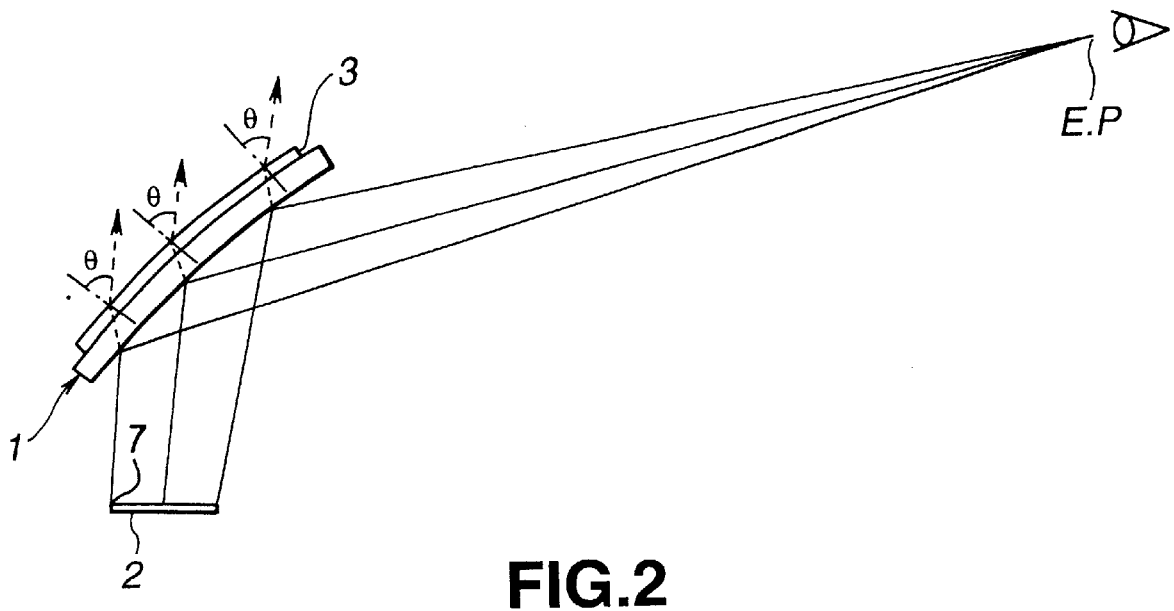
FIG. 1 is a diagrammatic illustration of a head-up display system according to a first embodiment of the present invention.

With reference to FIGS. 1–9, a display system according to the present invention will be described in detail, as follows. As shown in FIGS. 1–4 and 6–9, the display system has a platelike laminate, on which, for example, the vehicular information is projected from a display device 2. This platelike laminate is a combination of a transparent platelike object 1 and the after-mentioned functional film formed thereon (see FIGS. 1–4 and 6–7) or in an inside of the platelike object 1 (see FIGS. 8–9). This transparent platelike object 1 may be a conventional inorganic glass pane or an organic glass pane (e.g., resin plate), and it is not limited to a single plate. For example, it may be a laminate having a pair of transparent platelike objects and an interlayer film sandwiched therebetween. Furthermore, it may be another laminate of a glass plate and a transparent resin plate, which is free of an interlayer film therebetween (see FIGS. 8–9). A display system according to the present invention may be used as an automotive head-up display system or an architectural display system.

According to the after-mentioned second and third embodiments of the present invention, as shown in FIGS. 2–3, 7 and 9, the transparent platelike object 1 is curved to have a specially curved front (inboard) major surface such that all the polarized display light rays from the display device are incident on the platelike laminate at Brewster's angle of the platelike object or of the functional film. In contrast, according to the after-mentioned first and fourth embodiments of the present invention, as shown in FIGS. 1, 4, 6 and 8, a part of the polarized light rays from the display device is reflected from the laminate towards the eyepoint of the viewer, and the rest thereof is transmitted therethrough. Furthermore, the transparent platelike object 1 is curved to have a specially curved back (outboard) major surface such that the rest of the light rays, which has been transmitted therethrough, emerges from the platelike laminate at an angle equal to Brewster's angle of the platelike object or of the functional film. It should be noted that the surface configuration of the functional film is in conformity with that of the platelike object, as illustrated. Thus, when the functional film is formed on the specially curved inboard or outboard major surface of the platelike object, the functional film will also have a specially curved surface in parallel therewith.

According to the after-mentioned first or second embodiment, an optical rotatory film 3 is formed on an outboard or inboard specially curved major surface of the transparent platelike object 1, or in an inside of the platelike object 1, thereby to constitute a laminate. Herein, the outboard curved surface is defined as a surface from which the light rays emerge (see FIG. 1), and the inboard curved surface is defined as that on which the light rays impinge (see FIG. 2). The optical rotatory film 3 may be a liquid crystal polymer film, a transparent birefringent film, or a $\lambda/2$ phase film.

According to the after-mentioned third or fourth embodiment, a semitransparent reflective film 4 is formed on the outboard or inboard curved major surface of the transparent platelike object 1 to constitute a laminate. This reflective film 4 may be a metal thin film, for example, made of Al, Ag, Au or Cu, or a metal oxide thin film, for example, made of indium oxide or tin oxide.

In the invention, the display device 2 may be a cathodes ray tube (CRT), a fluorescent display tube, or a liquid crystal display. A polarizing member 7 may be disposed between the display device 2 and the laminate such that a polarized S-wave or P-wave impinges on the laminate, as will be clarified hereinafter. If desired, the polarizing member 7 may be built in the display device 2 to constitute a single unit. If a liquid crystal display (LCD) is used as the display device, the direction of a polarizing plate of the LCD may be designed such that light from the display device is polarized into S-wave or P-wave. With this, it is not necessary to provide an independent polarizing member.

According to the second and third embodiments shown in FIGS. 2–3, 7 and 9, the transparent platelike object 1 is curved to have a specially curved major inboard surface such that all the display light rays are incident on the curved major inboard surface of the transparent platelike object 1 or on the exposed surface of the optical rotatory film 3 at Brewster's angle (θ) of the transparent platelike object 1 or the optical rotatory film 3.

Figure 5:
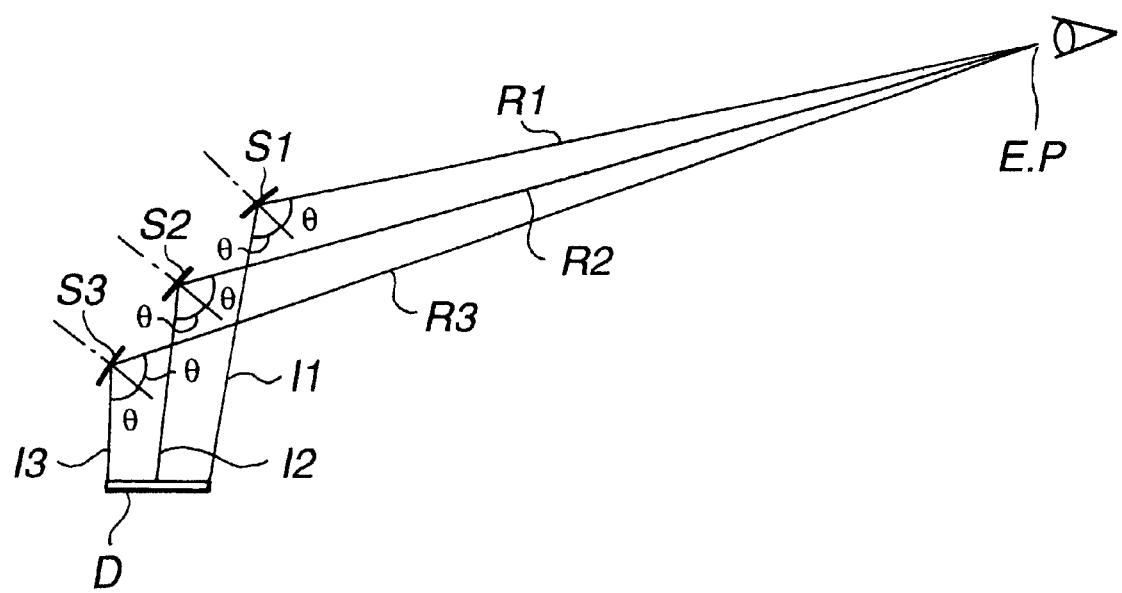
FIG. 5 is a diagrammatic fragmentary illustration of a head-up display system according to the present invention, showing three tangents (S1, S2 and S3) at three points of a curved surface (not shown), on which polarized light rays from a display device (D) in directions along lines I1, I2 and I3 are incident at Brewster's angle (θ)

In the invention, it can be assumed that the eyepoint (E.P) of a viewer and a display device D are fixed at certain predetermined positions shown in FIG. 5. In case that a display system of the invention is used as an automotive head-up display system, the line of vision of the viewer for looking at the display light may be in slightly downward directions along lines R1, R2 and R3, in view of the display magnification and display quality of the display device D. The lines of vision of the viewer along the lines R1 and R3 maybe respectively those for looking at the top and the bottom of the display image. The line R2 may be a bisector of the lines R1 and R3. Thus, it becomes possible to draw a line I1 that intersects with the line R1 at an angle of 2 θ (i.e., twice Brewster's angle), from one end of the display device D, as illustrated. Similarly, it becomes possible to draw a line I2 that intersects with the line R2 at an angle of 2 θ, from a middle point of the display device D, as illustrated. Furthermore, it becomes possible to draw a line 13 that intersects with the line R3 at an angle of 2 θ, from the other end of the display device D, as illustrated. Then, it becomes possible to draw a line segment S1 that is a normal to a bisector of the lines I1 and R1, as illustrated. This line S1 is also a tangent line of a reflective curved surface (not shown in FIG. 5) for reflecting the display light along the line I1 towards the eyepoint along the line R1. Similarly, it becomes possible to draw line segments S2 and S3 that are respectively a normal to a bisector of the lines I2 and R2 and a normal to a bisector of the lines I3 and R3, as illustrated. These line segments S2 and S3 are also tangent lines of the reflective curved surface for reflecting the display lights along the lines I2 and I3 towards the eyepoint along the lines R2 and R3, respectively. This reflective curved surface (line) can substantially be formed by smoothly extending the line segments S1, S2 and S3 into a nearly curved line segment. In other words, the transparent platelike object 1 is prepared so as to have a specially curved inboard and/or outboard major surface that is identical with the above-mentioned reflective curved surface. In reality, a flat platelike object may be ground or bent by a press to have a specially curved inboard and/or outboard major surface. In fact, according to the second and third embodiments, the transparent platelike object 1 is prepared so as to have a specially curved inboard major surface. Furthermore, the outboard major surface of the transparent platelike object 1 may be parallel with the inboard major surface. To be accurate, according to the second and third embodiments, the display light is reflected from the outboard surface of the transparent platelike object 1. Therefore, it is preferable to make a curve of the outboard surface, in view of the thickness of the platelike object. However, if the platelike object has a thickness of up to about 2 mm, any practical problems do not arise by making the outboard surface of the transparent object 1 parallel with the inboard surface. Similar to the second and third embodiments, according to the first and fourth embodiments, the transparent platelike object 1 is prepared so as to have a specially curved outboard major surface. Furthermore, the inboard major surface may be parallel with the outboard major surface, as long as the platelike object has a thickness of up to about 2 mm.

Figure 6:
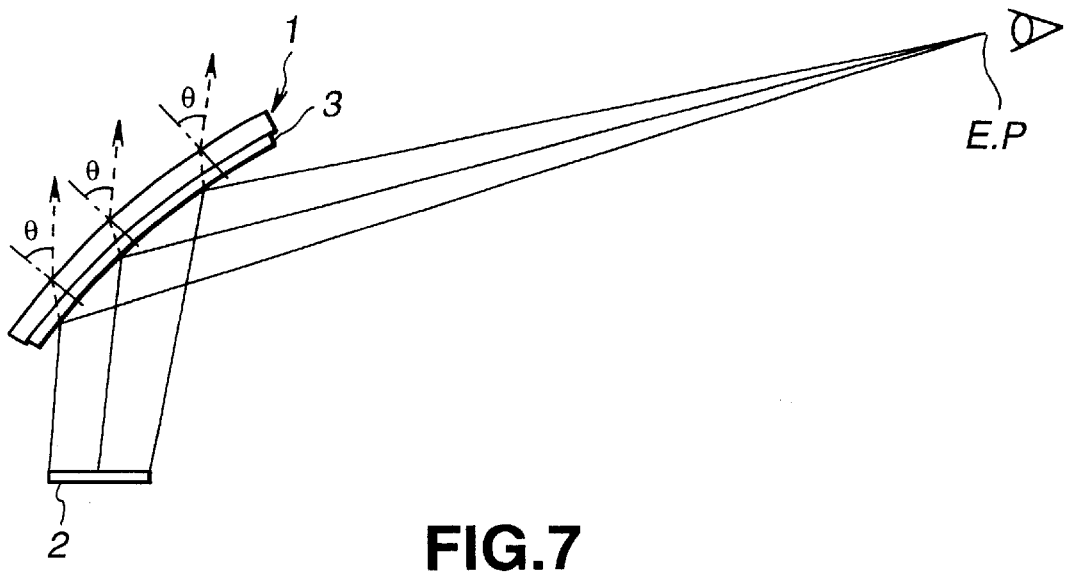
FIG. 6 is an illustration similar to FIG. 1, but showing another head-up display system according to the first embodiment.
Figure 8:
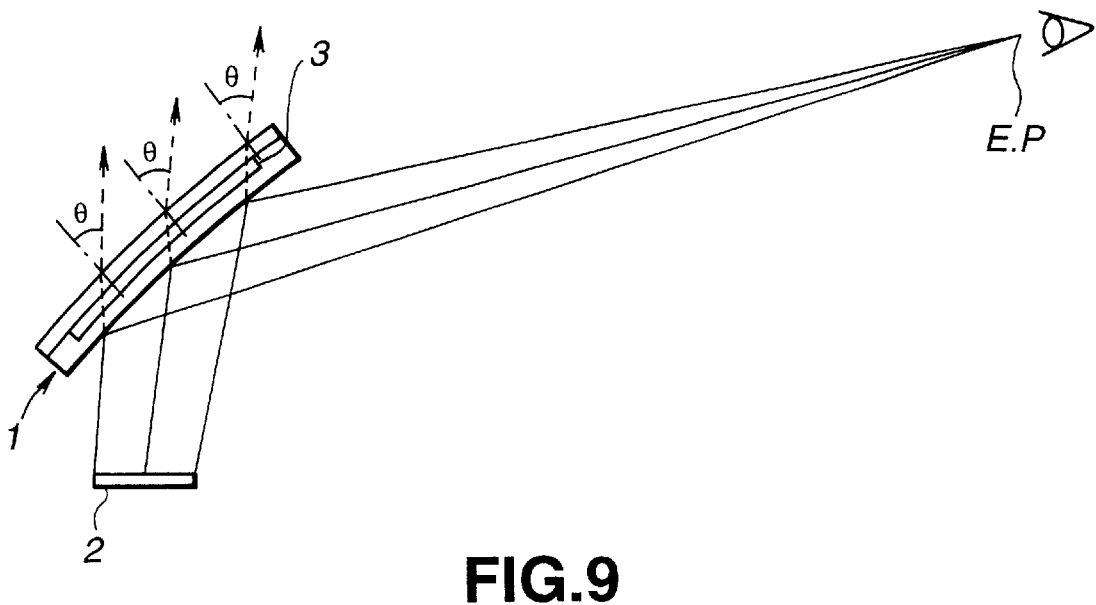
FIG. 8 is an illustration similar to FIG. 1, but showing still another head-up display system according to the first embodiment.

With reference to FIGS. 1, 6 and 8, a display system according to the first embodiment of the present invention will be described in detail, as follows. This display system as a head-up display system may be disposed on dashboard of a car. The display system has a transparent platelike object 1, for example, made of polymethyl methacrylate, having thereon or therein an optical rotatory film 3, for example, made of a liquid crystal polymer. In fact, the optical rotatory film 3 may be formed on the inboard or outboard major surface of the platelike object 1, as shown in FIGS. 1 and 6. Furthermore, as shown in FIG. 8, when the platelike object 3 is a laminate of first and second plates, the optical rotatory film 3 may be interposed between the first and second plates. Although not shown in FIG. 8, it is needless to say that the laminate of FIG. 8 may have a conventional interlayer film for bonding the first and second plates together, besides the optical rotatory film. The display system further has a display device (e.g., liquid crystal display) and a polarizing plate (not shown) for polarizing light from the display device into S-wave. When the polarized S-wave is projected on the transparent platelike object 1 (see FIGS. 1 and 8) or the optical rotatory film 3 (see FIG. 6) at an angle substantially the same as Brewster's angle of one member of the platelike object 1 and the optical rotatory film 3, which one member borders on the inboard major surface of the platelike laminate, part of the S-wave is reflected from the inboard major surface of the platelike laminate and then reaches the eyepoint of a viewer, as illustrated. In contrast, the rest of the S-wave is transmitted through the platelike laminate and is rotated into the P-wave by the optical rotatory film 3, and then reaches an interface between the outboard major surface of the platelike laminate and the air. It should be noted that the outboard major surface of the platelike object 1 is specially curved. With this, when the optical rotatory film 3 is formed on the outboard major surface of the platelike object 1 as shown in FIG. 1, the exposed surface of the optical rotatory film 3 is also specially curved in parallel with the outboard major surface thereof Thus, substantially all of the P-wave light rays emerge from the outboard major surface of the platelike laminate into the air at an angle θ that is substantially equal to Brewster's angle of one of the optical rotatory film 3 and the platelike object 1, without reflection from the interface towards the viewer. Thus, the double image phenomenon does not arise. The angle θ is defined between a direction of propagation of the P-wave light ray in the air and a line that is perpendicular to the outboard major surface of the platelike laminate at a point of emergence of the P-wave light ray from the platelike laminate into the air.

Figure 2:
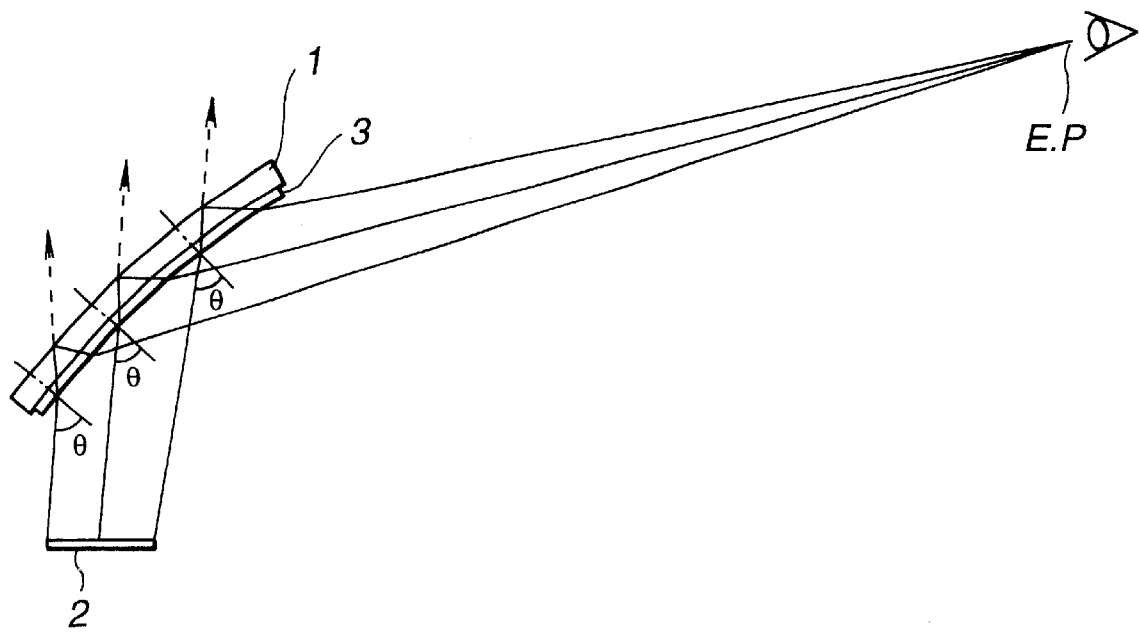
FIGS. 2–4 are illustrations similar to FIG. 1, but respectively showing those according to second to fourth embodiments of the present invention.
Figure 7:
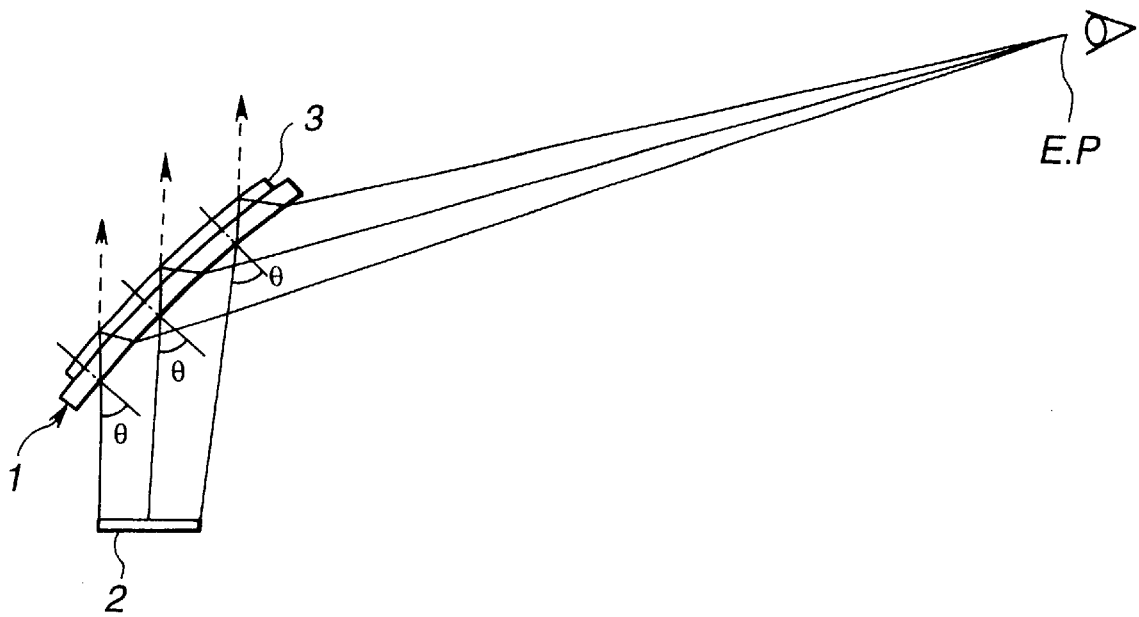
FIG. 7 is an illustration similar to FIG. 2, but showing another head-up display system according to the second embodiment.
Figure 9:
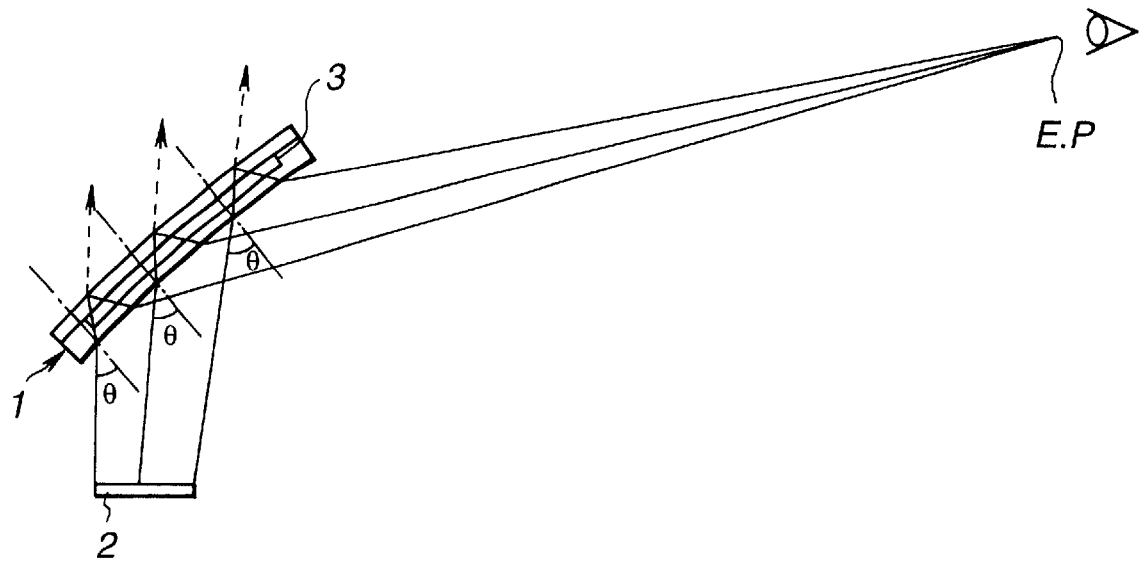
FIG. 9 is an illustration similar to FIG. 2, but showing still another head-up display system according to the second embodiment.

With reference to FIGS. 2, 7 and 9, a display system according to the second embodiment of the present invention will be described in detail, as follows. This display system has a transparent platelike object 1, for example, made of polymethyl methacrylate, having thereon or therein an optical rotatory film 3 such as λ/2 phase film. In fact, as mentioned in the first embodiment, the optical rotatory film 3 may be formed on the inboard or outboard major surface of the platelike object 1, as shown in FIGS. 2 and 7. Furthermore, as shown in FIG. 9, the optical rotatory film 3 may be interposed between first and second plates of the platelike object 1. Unlike the first embodiment, the display system has a polarizing plate (not shown) for polarizing light from the display device 2 into P-wave. When the polarized P-wave is projected on the inboard major surface of the platelike laminate at Brewster's angle of one member of the optical rotatory film 3 or the platelike object 1, which one member bordering the inboard major surface of the platelike laminate, all of the P-wave is transmitted into the platelike laminate, without reflection from the inboard major surface of the platelike laminate. After that, the P-wave is rotated into S-wave by the optical rotatory film 3, and then part of the S-wave emerges into the air from the outboard major surface of the platelike laminate. In contrast, the rest of the S-wave is reflected from the outboard major surface of the platelike laminate and then rotated by the optical rotatory film 3 into the P-wave, and then reaches the inboard major surface of the platelike laminate. Then, substantially all the light rays of the P-wave emerge from the platelike laminate into the air and then reaches the eyepoint of a viewer. Thus, the double image phenomenon does not arise.

Figure 3:
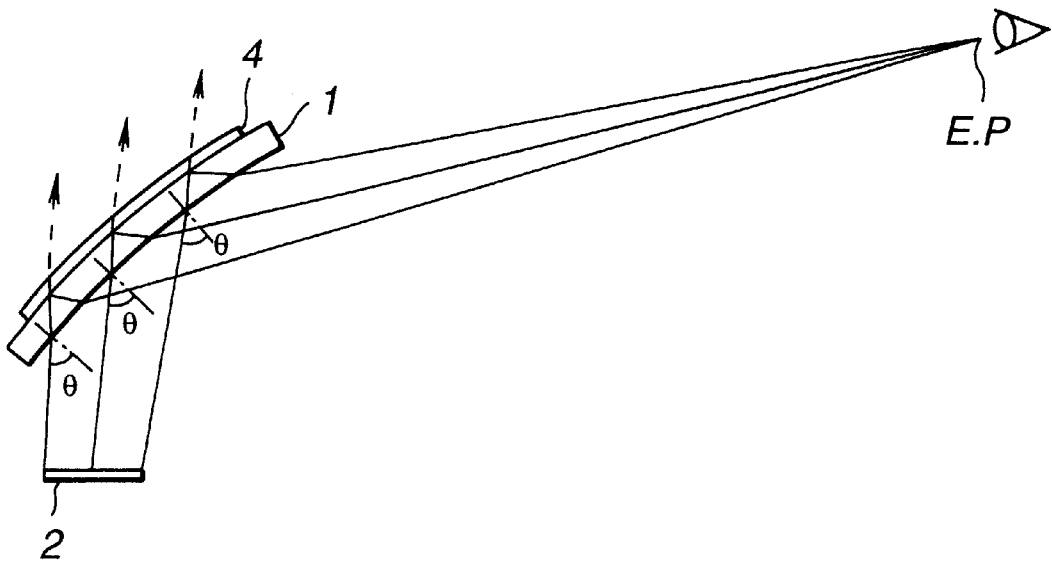

With reference to FIG. 3, a display system according to the third embodiment of the present invention will be described in detail, as follows. This display system has a transparent platelike object 1, for example, made of polymethyl methacrylate, having thereon a semitransparent reflective film 4 such as an aluminum film. The display system has a polarizing plate (not shown) for polarizing light from a display device 2 into P-wave. When the polarized P-wave is projected on the inboard major surface of the transparent platelike object 1 at Brewster's angle of the platelike object 1, all of the P-wave is transmitted into the platelike object, without reflection therefrom. Then, part of the P-wave is reflected from the semitransparent reflective film, then transmitted in the platelike object 1, then emerges from the inboard major surface of the platelike object 1, and then reaches the eyepoint of a viewer. In contrast, the rest of the P-wave is not reflected from the reflective film 4, but is transmitted therein and then emerges into the air. Thus, the double image phenomenon does not arise.

Figure 4:
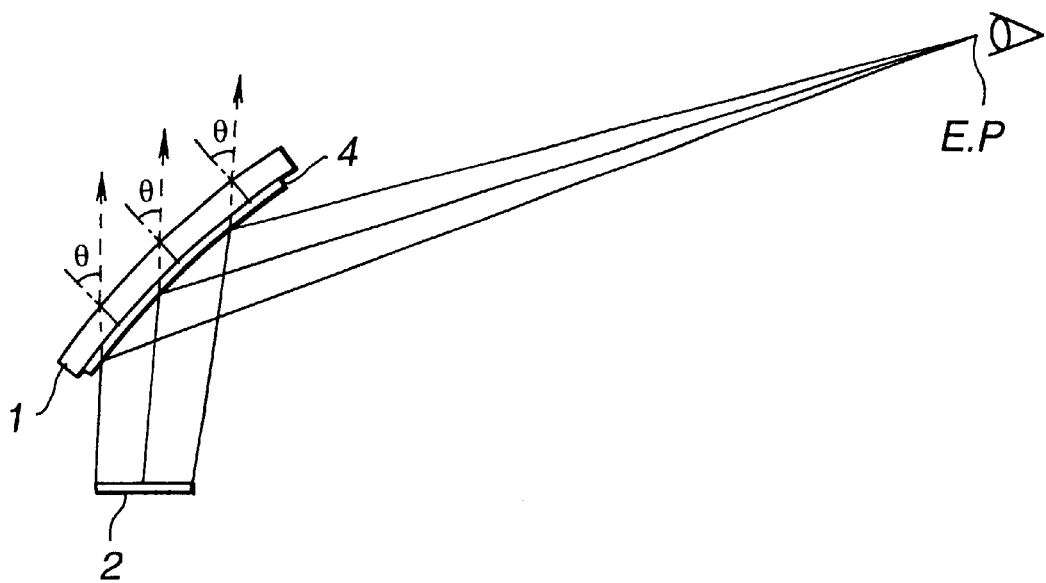

With reference to FIG. 4, a display system according to the fourth embodiment of the present invention will be described in detail, as follows. This display system has a transparent platelike object 1, for example, made of polymethyl methacrylate, having thereon a semitransparent reflective film 4 such as an aluminum film, as illustrated. The display system has a polarizing plate (not shown) for polarizing light from a display device 2 into P-wave. When the polarized P-wave is projected on the inboard major surface of the reflective film 4 at an angle substantially the same as Brewster's angle of the reflective film 4, part of the P-wave is reflected therefrom and then reaches the eyepoint of a viewer. In contrast, the rest of the P-wave is transmitted in the reflective film 4 and then in the platelike object 1, and then reaches an interface between the outboard surface of the platelike object 1 and the air. The outboard major surface of the platelike object is specially curved such that substantially all of the rest of the P-wave light rays emerge from the outboard major surface thereof into the air at an angle θ that is substantially equal to Brewster's angle of the platelike object 1, without reflection from the interface. Therefore, the double image phenomenon does not arise. This angle θ is defined in the same manner as in the above-mentioned first embodiment.

The entire disclosure of Japanese Patent Application No. 9-174517 filed on Jun. 30, 1997, including specification, claims, drawings and summary, is incorporated herein by reference in its entirety.

What is claimed is:

1. A display system comprising:

a transparent platelike object having a first and a second major surface opposed to each other;

an optical rotatory film for rotating a plane of polarization of light rays, said optical rotatory film being formed on said first or said second major surface of said platelike object or in an inside of said platelike object, a combination of said transparent platelike object and said optical rotatory film constituting a platelike laminate, said platelike laminate having a front major surface and a back major surface that is an interface between said platelike laminate and an air, and a display device for providing, against said front major surface of said platelike laminate, light rays that are intended to be viewed by a viewer, said display device having a polarizing member for polarizing said light rays into S-wave light rays; and wherein said front major surface of said platelike laminate faces said display device such that a part of said S-wave light rays from said polarizing member is reflected from said front major surface of said platelike laminate towards one-eye point of said viewer and that a remainder of said S-wave light rays is transmitted in said platelike laminate and is converted by said optical rotatory film into P-wave light rays, wherein said back major surface of said platelike laminate is curved such that substantially all of said P-wave light rays emerge from said back major surface of said platelike laminate into said air at an angle that is substantially equal to Brewster's angle of one member selected from said optical rotatory film and said platelike object, said one member bordering on said back major surface of said platelike laminate, said angle being defined between a direction of propagation of said P-wave light ray in said air and a line that is perpendicular to said back major surface of said platelike laminate at a point of emergence of said P-wave light ray from said platelike laminate into said air.

2. A display system according to claim 1, wherein said platelike object has a thickness of up to about 2 mm, and wherein said front major surface of said platelike laminate is curved in parallel with said back major surface of said platelike laminate.

3. A display system according to claim 1, wherein said optical rotatory film is selected from the group consisting of a liquid crystal polymer film, a transparent birefringent film, and a λ/2 phase film.

4. A display system according to claim 1, wherein said transparent platelike object is made of polymethyl methacrylate.

5. A display system according to claim 1, which is an automotive head-up display system.

6. A display system according to claim 1, wherein said display device is selected from the group consisting of a cathode-ray tube, a fluorescent display tube, and a liquid crystal display.

7. A display system according to claim 1, wherein said platelike object is a laminate of first and second plates.

8. A display system according to claim 7, wherein said optical rotatory film is interposed between said first and second plates.

9. A display system according to claim 7, wherein said platelike object has an interlayer film interposed between said first and second plates.

* * * * *